(12) United States Patent
Meneses et al.

(10) Patent No.: US 7,226,131 B2
(45) Date of Patent: Jun. 5, 2007

(54) ADJUSTABLE SEAT BELT GUIDE ASSEMBLY

(75) Inventors: Pedro Meneses, Miami, FL (US); Kurt Anglese, Miami, FL (US)

(73) Assignee: B/E Aerospace, Inc., Wellington, FL (US)

( * ) Notice: Subject to any disclaimer, the term of this patent is extended or adjusted under 35 U.S.C. 154(b) by 291 days.

(21) Appl. No.: 10/943,672

(22) Filed: Sep. 17, 2004

(65) Prior Publication Data
US 2006/0061202 A1    Mar. 23, 2006

(51) Int. Cl.
*B60R 21/00* (2006.01)
(52) U.S. Cl. .................. 297/480; 297/483; 297/452.18
(58) Field of Classification Search ........... 297/452.18, 297/473, 480, 478, 483; 280/801.2, 802, 280/806
See application file for complete search history.

(56) References Cited

U.S. PATENT DOCUMENTS

| 5,071,194 A | * | 12/1991 | Fohl ........................... 297/478 |
| 5,390,982 A | * | 2/1995 | Johnson et al. ............. 297/410 |
| 5,599,070 A | * | 2/1997 | Pham et al. ................. 297/483 |
| 5,624,160 A | | 4/1997 | Koch et al. |
| 5,921,629 A | | 7/1999 | Koch et al. |
| 6,135,499 A | * | 10/2000 | Holzapfel et al. ....... 280/801.2 |
| 6,145,881 A | * | 11/2000 | Miller et al. ................ 280/806 |
| 6,412,864 B1 | | 7/2002 | Larson |

OTHER PUBLICATIONS

U.S. Appl. No. 10/943,272, filed Sep. 17, 2004, Williamson et al.
U.S. Appl. No. 10/944,134, filed Sep. 17, 2004, Williamson et al.
U.S. Appl. No. 10/944,487, filed Sep. 17, 2004, Williamson et al.
U.S. Appl. No. 10/944,488, filed Sep. 17, 2004, Williamson et al.

* cited by examiner

*Primary Examiner*—Milton Nelson, Jr.
(74) *Attorney, Agent, or Firm*—Drinker Biddle & Reath LLP

(57) ABSTRACT

A seat belt assembly capable of extending from a seat back, the assembly including a frame attached to a seat, an extension member slidably mounted to the frame, an inertial locking reel, and a seat belt positioned within the frame in contact with the extension member, the seat belt having a first end engaged with the inertial locking reel and a second end extending from the extension member.

22 Claims, 11 Drawing Sheets

FIG. 4A   FIG. 4B

ADJUSTABLE SEAT BELT GUIDE ASSEMBLY

CROSS-REFERENCE TO RELATED PATENT APPLICATIONS

Related subject matter is disclosed in copending U.S. patent application Ser. No. 10/944,134, filed Sep. 17, 2004, entitled A CURVED PROFILE TRACKING PLATFORM FOR A PASSENGER SEAT; U.S. patent application Ser. No. 10/944,488, filed Sep. 17, 2004, entitled INDEPENDENT DIVAN DOOR AND DRAWER ASSEMBLY; U.S. patent application Ser. No. 10/943,272, filed Sep. 17, 2004, entitled FLEXIBLE SEAT FRAME; and U.S. patent application Ser. No. 10/944,487, filed Sep. 17, 2004, entitled ATTACHMENT ASSEMBLY FOR MOUNTING A SEAT TO THE FLOOR OF A VEHICLE.

FIELD OF THE INVENTION

This invention pertains to a seat restraint and, more particularly, to a seat belt guide for use in a divan.

BACKGROUND OF THE INVENTION

Since the earliest days of aviation, seat belts have been required for all occupants of an aircraft. The first restraints were mere lap belts that were attached at either side of the seat and extended across the lap of the person sitting in the seat. Today's passenger jets use a modern variance of the lap belt with the two piece belt and quick release buckle that is required in all passenger seats.

Over time, a shoulder harness was added to the pilot's seat. This restraint allowed the pilot to remain upright in the event of a hard landing or crash. Although most passenger seats used in commercial airliners do not have a shoulder harness, seating used in private aircraft and, in particular, business jets are beginning to feature a restraint system that employs such a harness.

Unlike the interior of a commercial jetliner where seats are aligned in rows facing forward, the interior of a business jet may include individual seats and divans that face sideways or aft. A divan is a bench-type seat that allows for one or more passengers to be seated together. Frequently, divans have to be designed with high backs in order to accommodate the restraint assembly necessary for a shoulder harness. This high back design makes it difficult, if not uncomfortable for passengers sitting on the divan to converse with one another during flight as the high back does not allow one to rest their arm on top of the seat. Furthermore, depending on the interior arrangement, the high back seat may block a window, thereby reducing the amount of sunlight in the cabin.

In light of these shortcomings, a seat-belt guide assembly that is capable of extending to provide for a shoulder harness when necessary, yet capable of being retracted into the seat back when not in use, would be an important improvement in the art.

BRIEF SUMMARY OF THE INVENTION

The invention is directed to a seat-belt guide assembly that is comprised of a frame attached to a seat, an extension member slidably mounted to the frame, an inertial locking reel, and a seat belt positioned within the frame in contact with the extension member. The seat belt includes a first end that is engaged with the inertial locking reel and a second end that extends from the extension member.

In one embodiment of the invention, a frame is attached to a seat, the frame having a first end and a second end, an extension member is slidably positioned within the frame, an inertial locking reel is located in proximity to the first end of the frame, and a seat belt is positioned within the frame in contact with the extension member. The seat belt includes a first end that is engaged with the inertial locking reel and a second end that extends from the second end of the guide frame.

BRIEF DESCRIPTION OF THE DRAWINGS

FIG. 4A is a perspective of the seat belt guide assembly showing the extension member in the retracted position.

FIG. 4B is a perspective of the seat belt guide assembly showing the extension member fully extended.

DETAILED DESCRIPTION OF THE INVENTION

Figure 1:
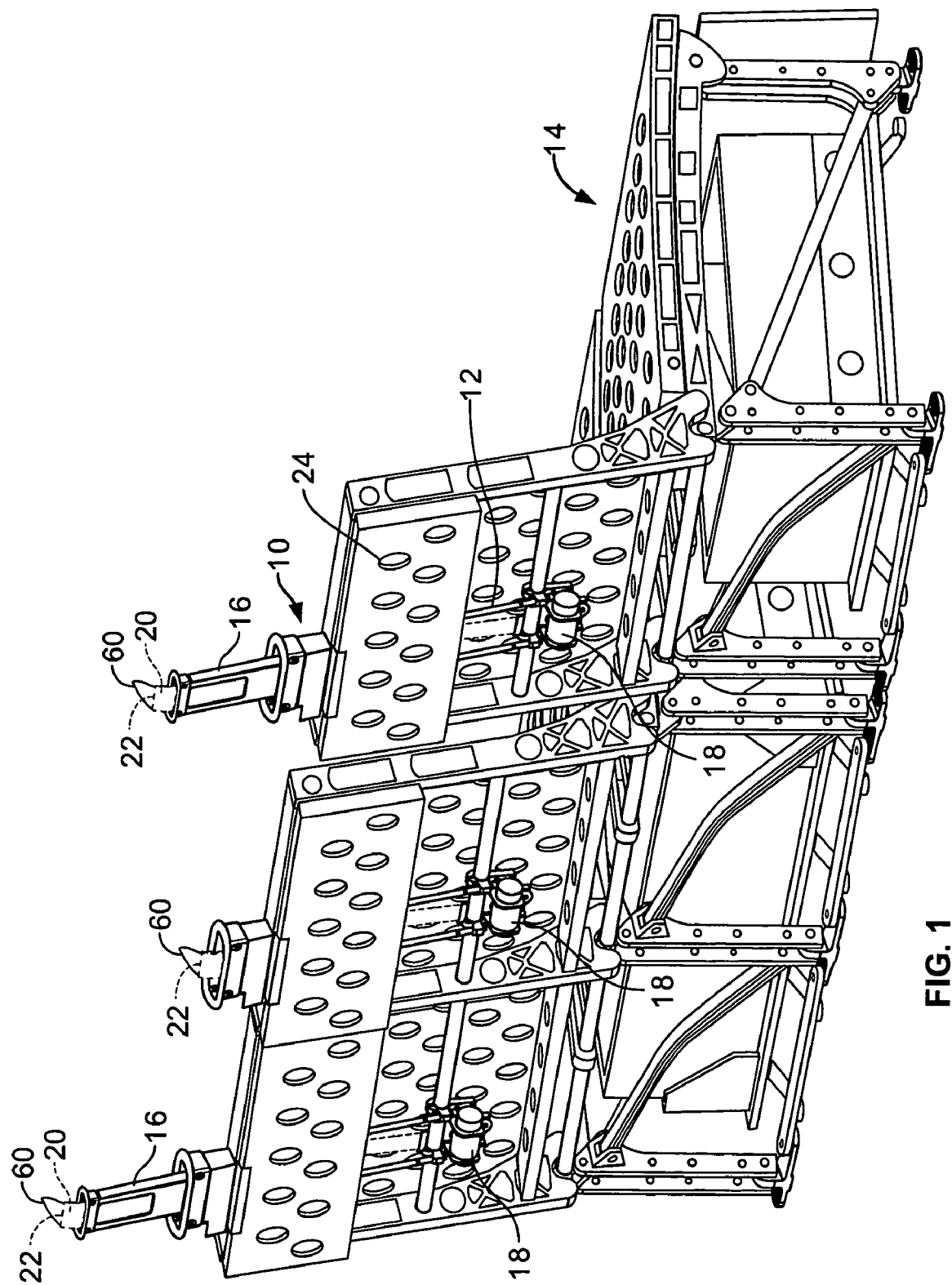
FIG. 1 is a perspective of a divan seat frame showing the seat belt guide assembly installed in the seat back.
Figure 2:
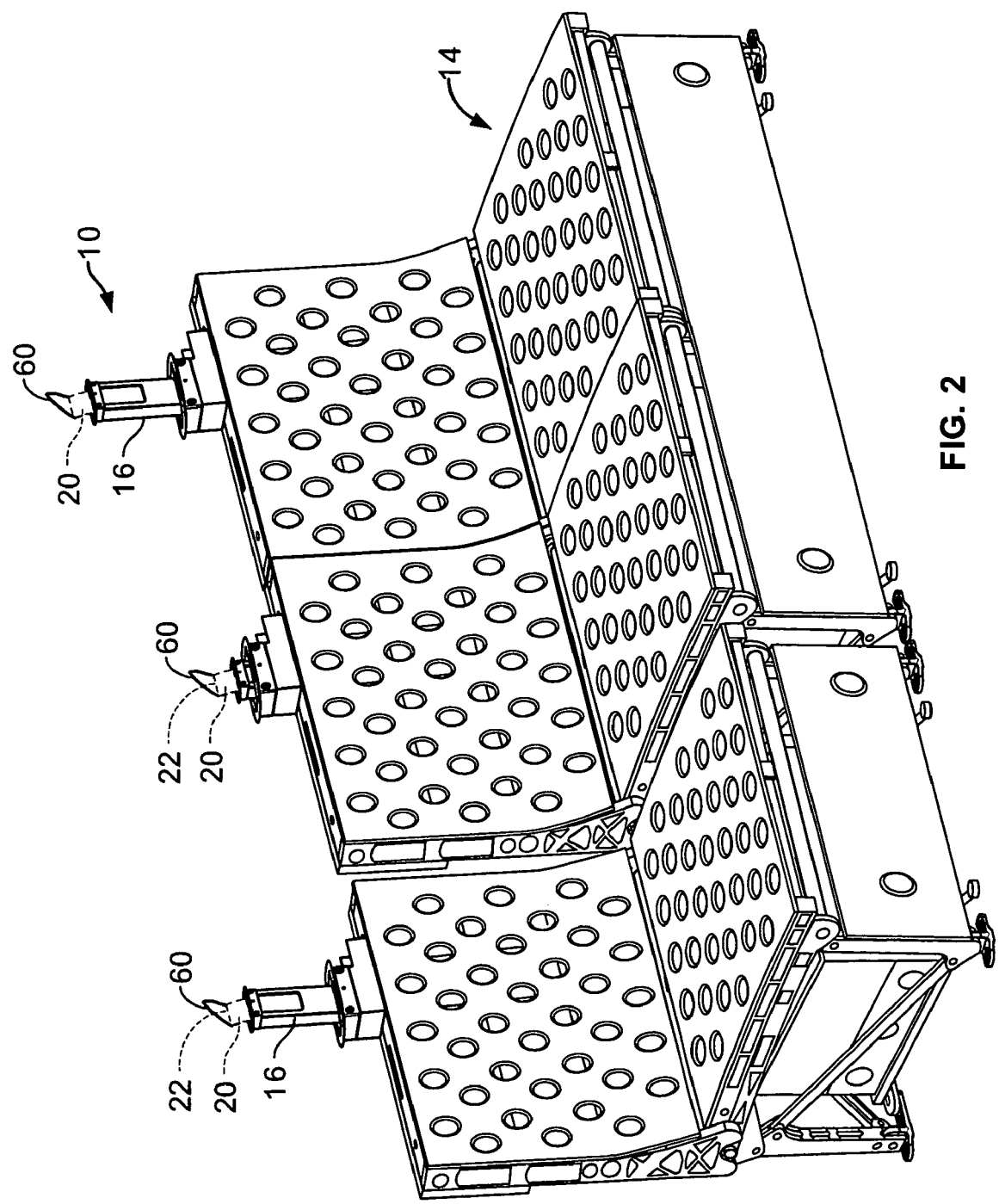
FIG. 2 is a perspective showing the front of a divan seat frame with the seat belt guide assembly extending from the top of the seat back.
Figure 3:
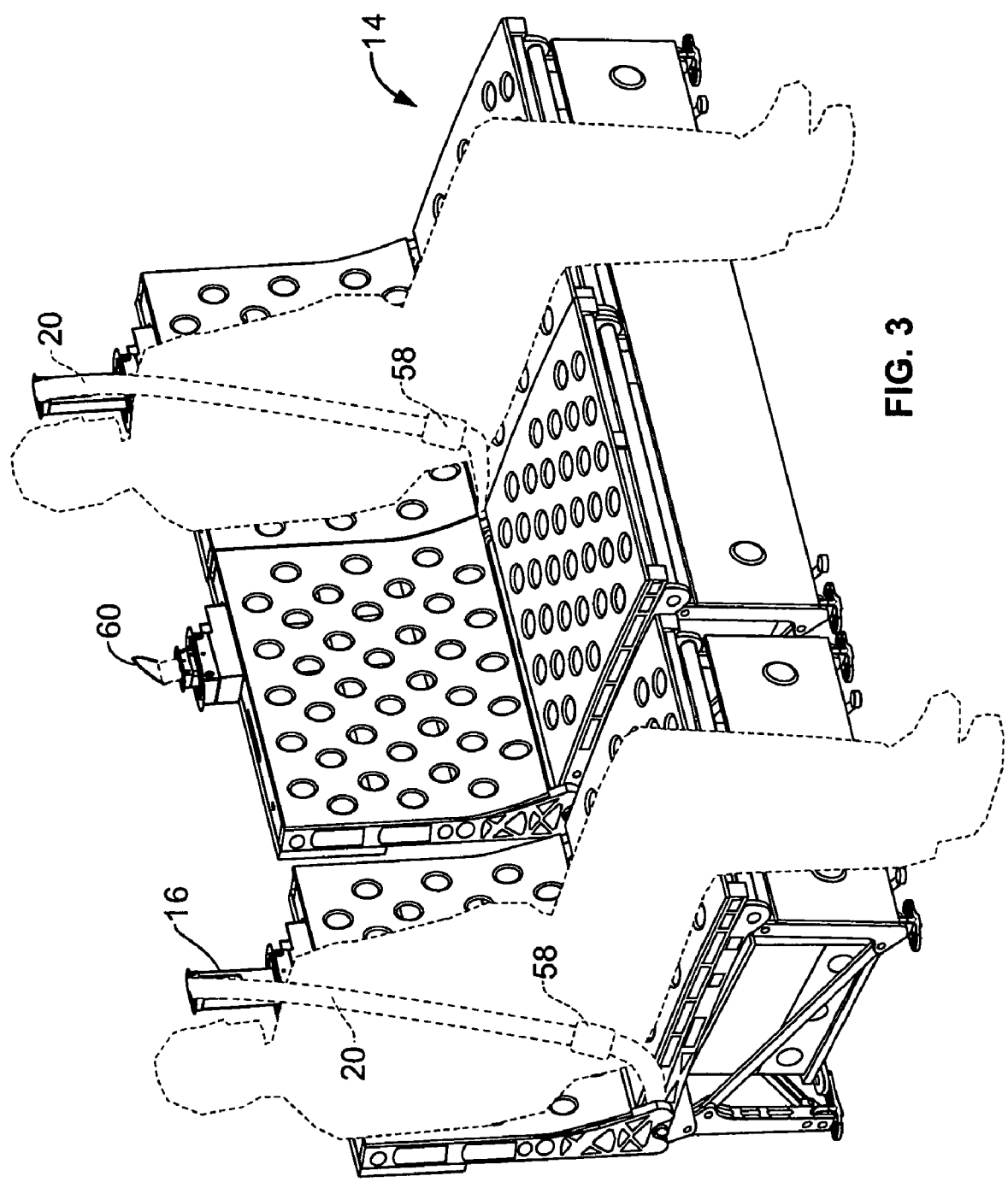
FIG. 3 is a perspective of the front of a divan seat frame showing a phantom view of passengers secured in their seat with the seat belt guide assembly.

FIGS. 1–10 and 13 show the invention that is directed to a seat belt assembly 10 that is comprised of a frame 12 attached to a seat 14. An extension member 16 is connected with respect to the frame 12, and an inertial locking reel 18, and a seat belt 20 are positioned within the frame 12 in contact with the extension member 16. The seat belt 20 has a first end (not shown) engaged with the inertial locking reel 18 and a second end 22 that extends from the extension member 16. In one aspect of the invention, the extension member 16 is slidably mounted with respect to the frame 12.

Figure 8:
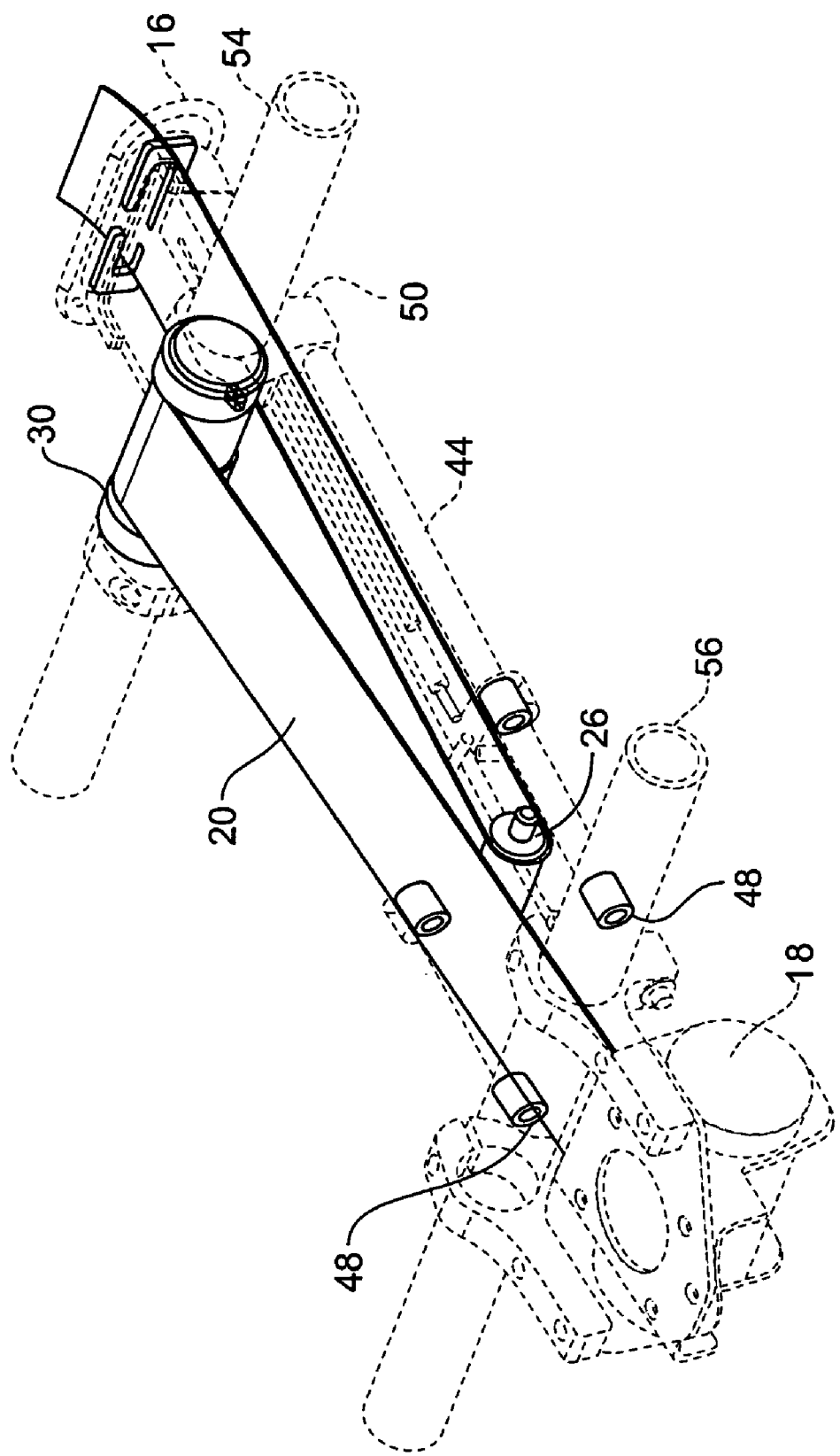
FIG. 8 is a perspective of the seat belt guide assembly highlighting the path of the seat belt.
Figure 10:
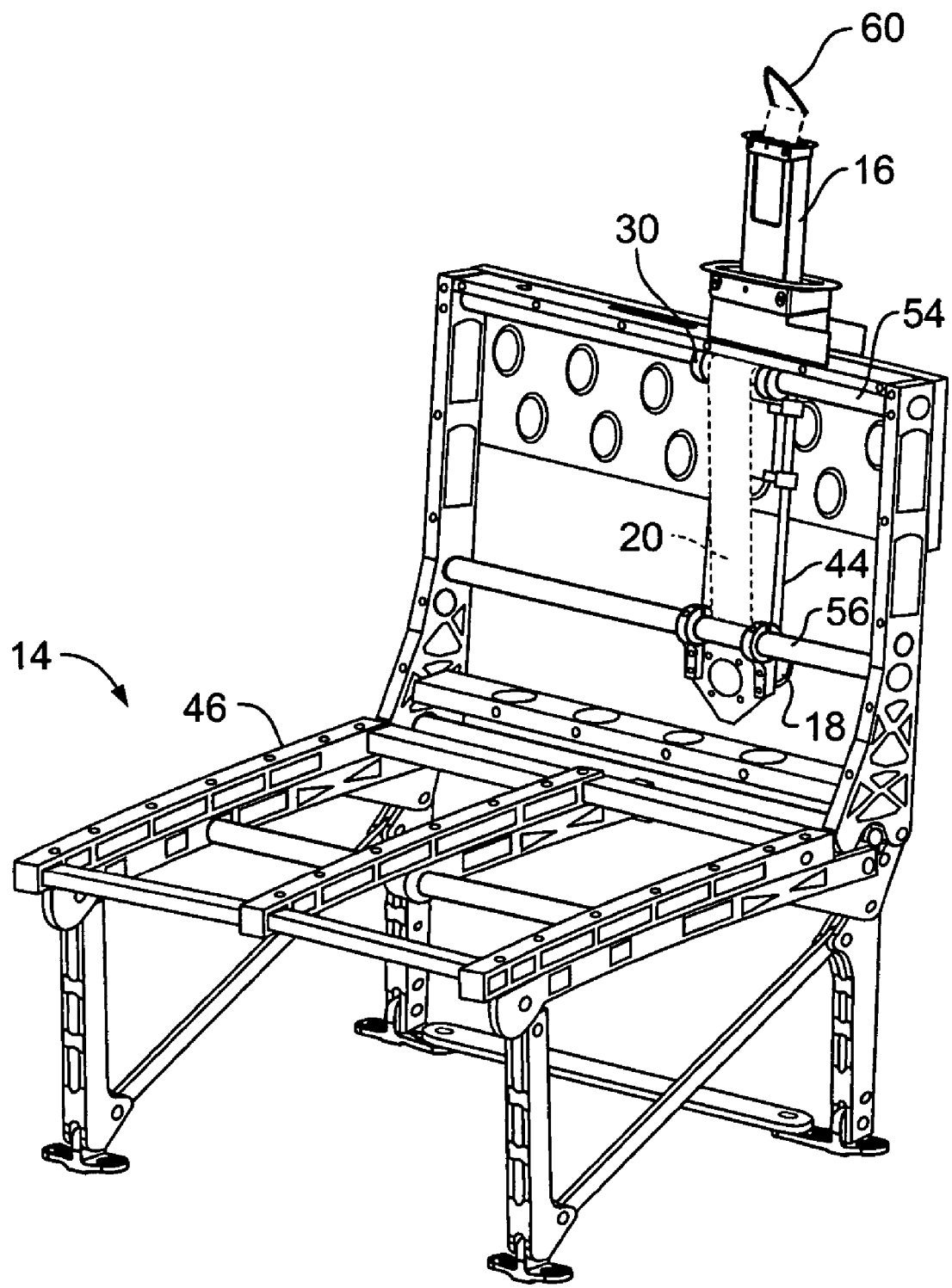
FIG. 10 is a perspective view of the interior of a seat frame showing the seat belt assembly mounted in the seat back.

As shown in FIGS. 1–3 and 10, the seat belt assembly 10 can be installed in the back 24 of a seat 14. In one embodiment, as shown in FIG. 8, a first roller 26 is attached to a portion of the extension member 16 and a second roller 30 is attached to the frame 12. The seat belt 20 then engages both the first and second roller 26, 30. In one version of the embodiment, as shown in FIG. 10, the second roller 30 circumscribes a portion 54 of the seat 14.

Figure 4C:
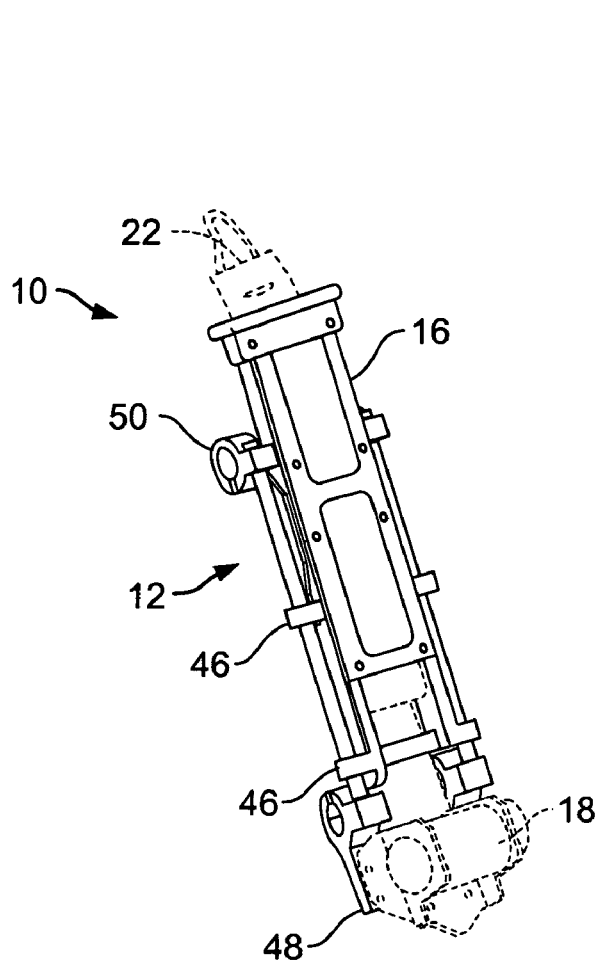
FIG. 4C is a perspective of the seat belt guide assembly showing the extension member fully extended and the seat belt in phantom.
Figure 4C:
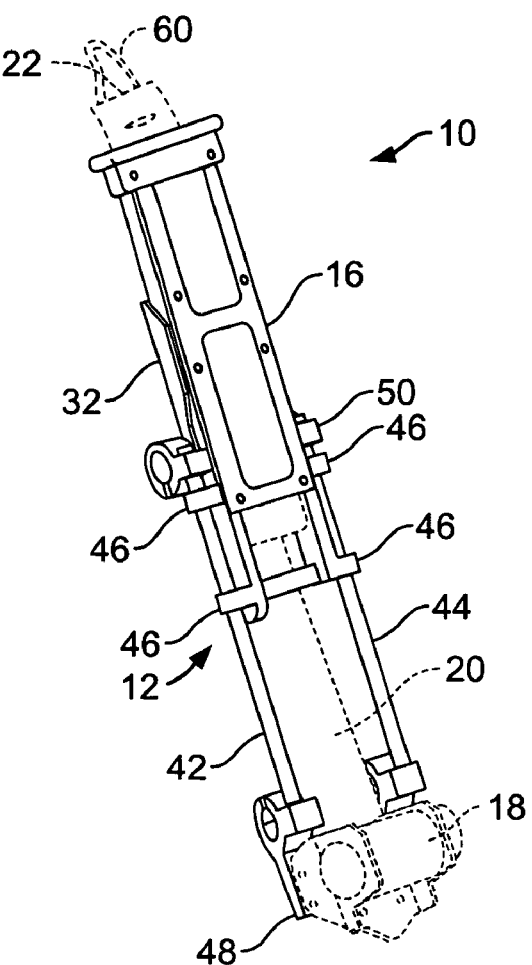
Figure 4C:
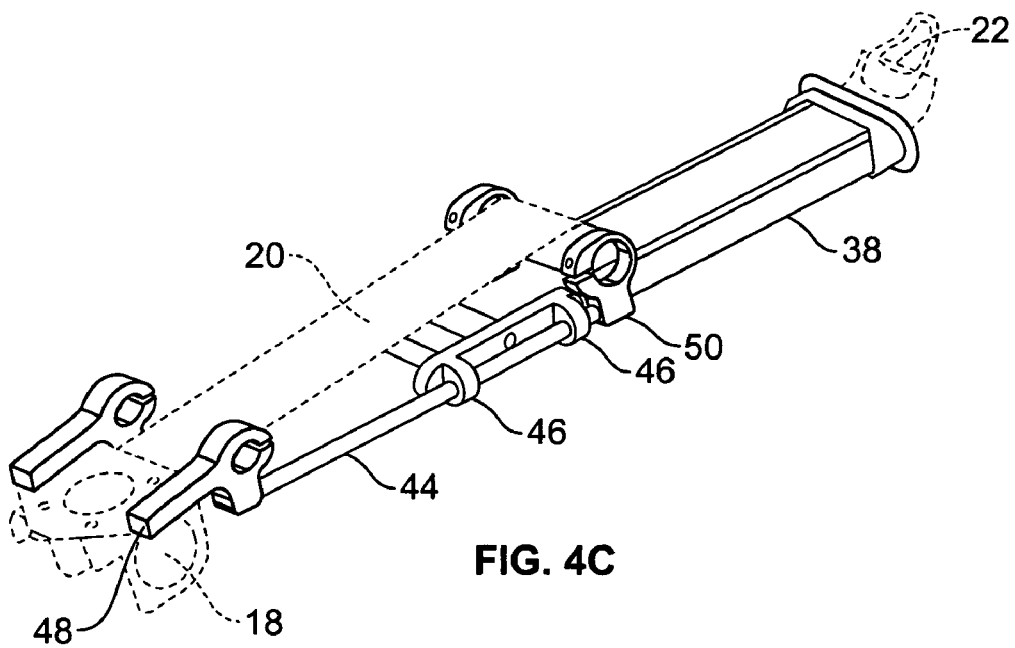
Figure 7:
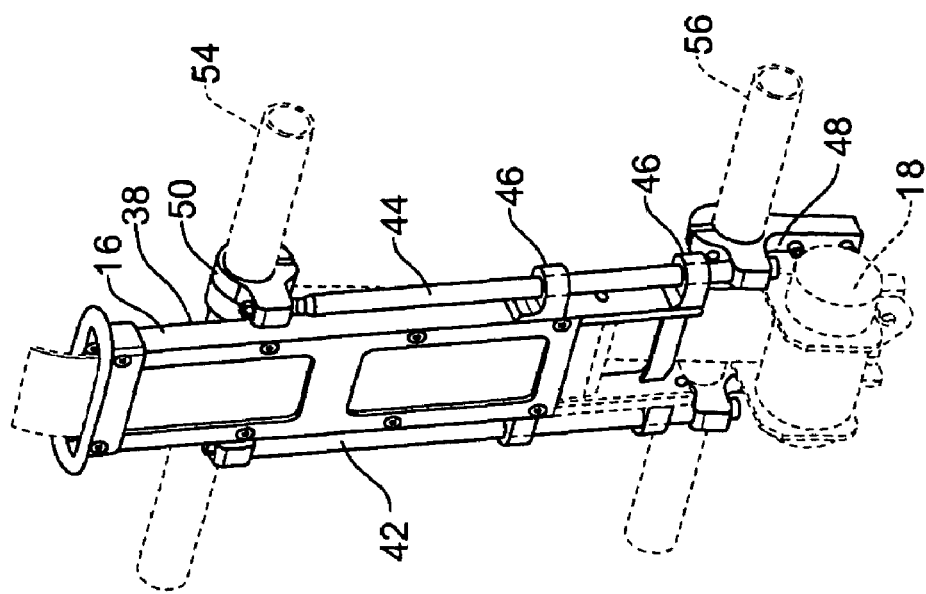
FIG. 7 is a perspective of the seat belt guide assembly showing the cross tubes of the seat frame and the seta belt in phantom.
Figure 6:
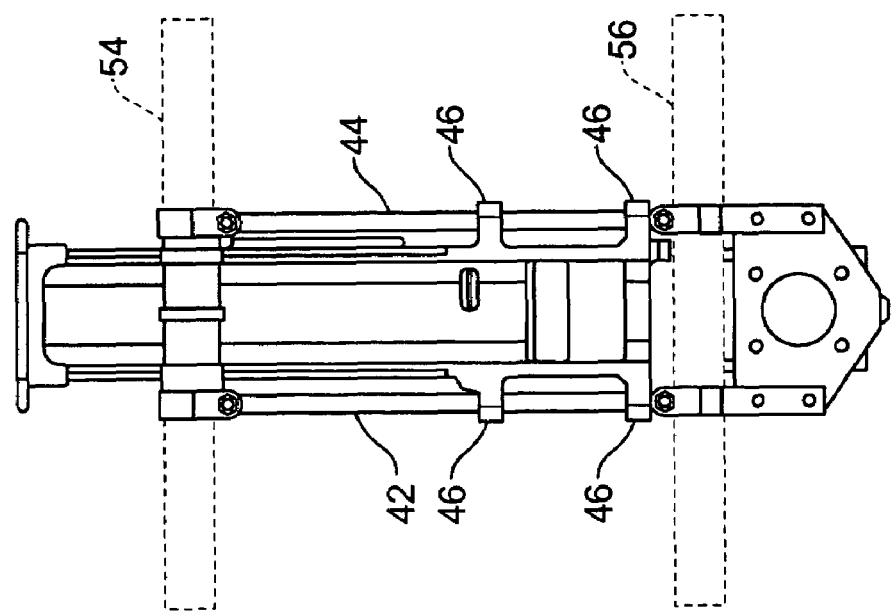
FIG. 6 is a front view of the seat belt guide assembly showing the cross tubes of the seat frame in phantom.
Figure 5:
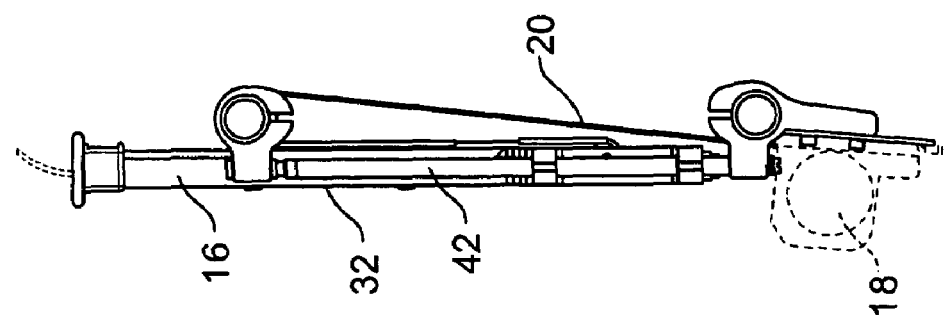
FIG. 5 is a side view of the seat belt guide assembly.
Figure 11A:
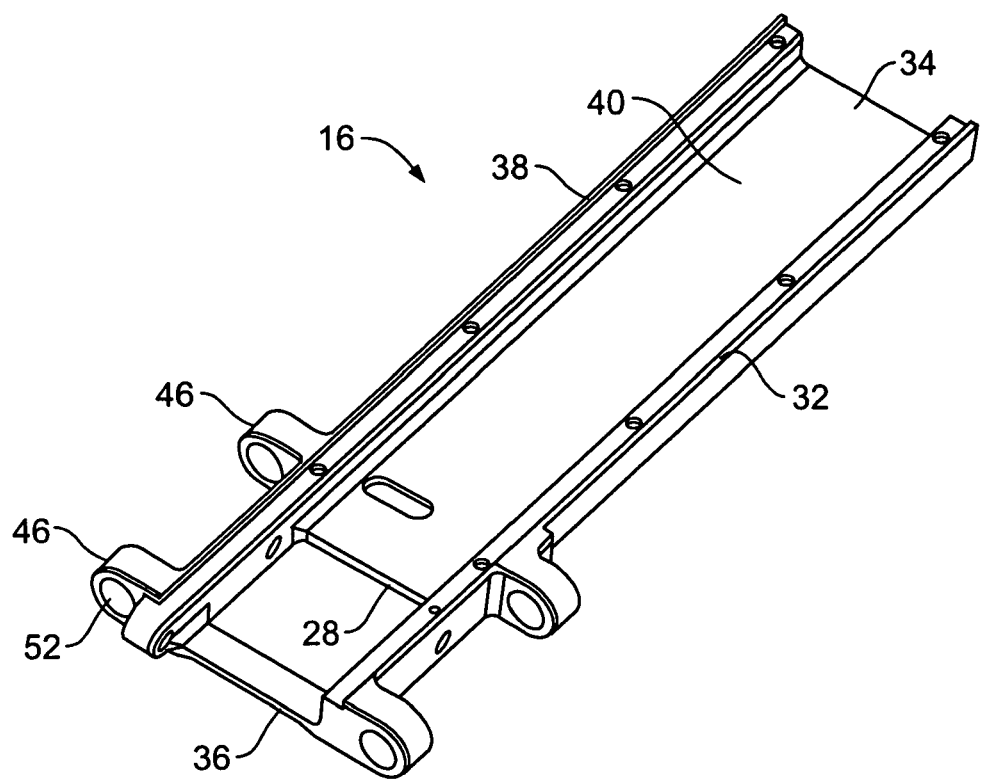
FIG. 11A is a perspective of one side of the extension member.
Figure 11B:
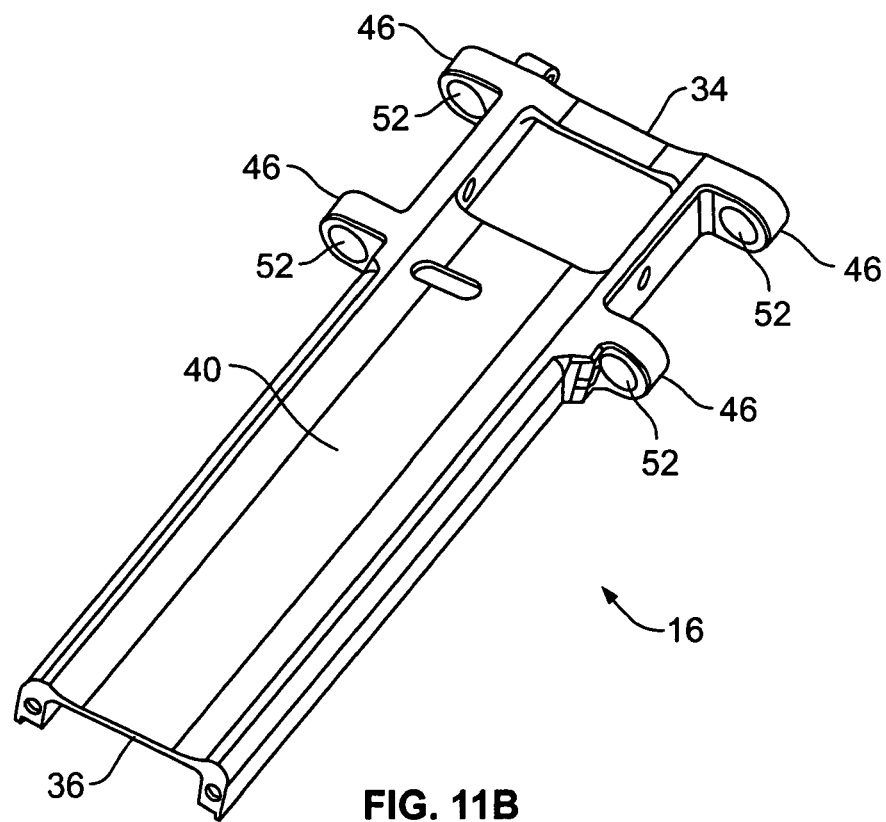
FIG. 11B is a perspective view of a second side of the extension member.

As shown in FIGS. 11(A–B) and 12(A–C), the extension member 16 has a first edge 32 that extends between a first end 34 and a second end 36. A second edge 38 is separated from and substantially parallel to the first edge 32, and a backing plate 40 extends between the first and second edges 32, 38. The frame 12, as shown in FIGS. 4–8, includes first and second guide tracks 42, 44 which are substantially parallel to each other. As shown in FIGS. 4, 5 and 7, these guide tracks 42, 44 are adjacent to the first and second edge 32, 38 of the extension member, respectively. A portion of each edge 32, 38 of the extension member 16 defines at least one guide port 46 as shown in FIGS. 11(A–B), and the first and second guide track 42, 44 extend through the at least one guide port 46 in the first and second edge 32, 38, respectively.

Figure 12A:
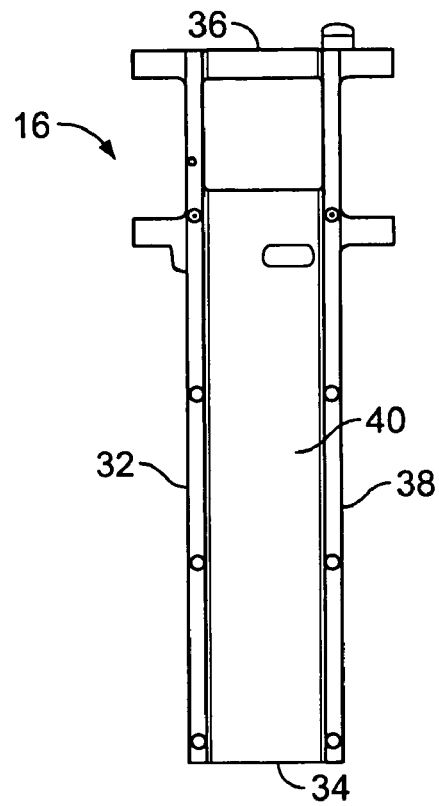
FIG. 12A is front view of the extension member.
Figure 12B:
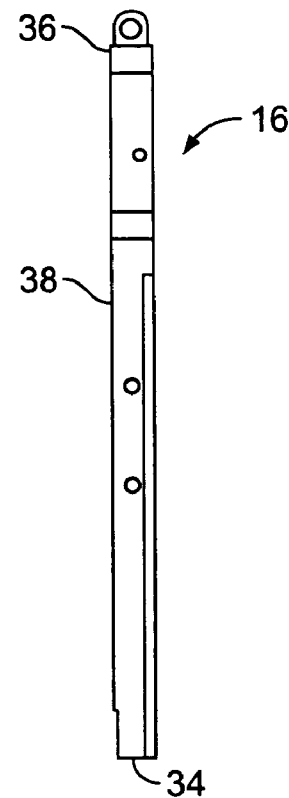
FIG. 12B is a side view of the extension member.
Figure 12C:
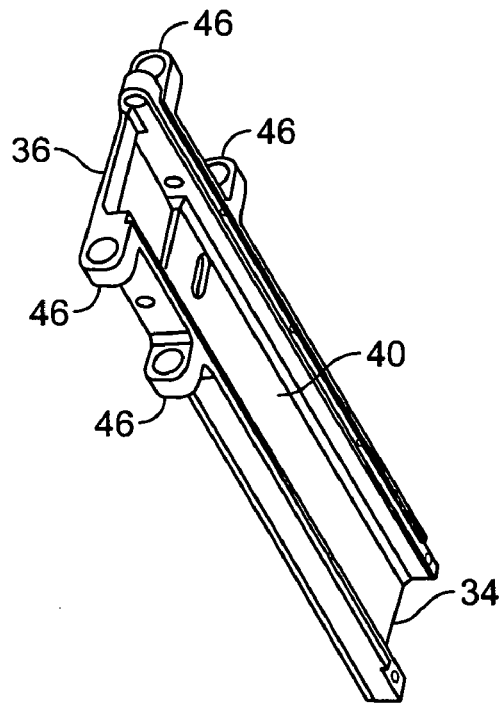
FIG. 12C is a perspective view of the extension member.
Figure 12D:
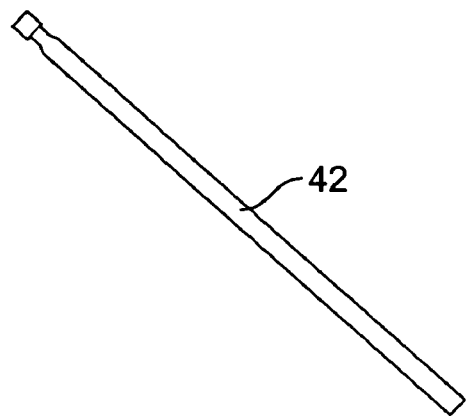
FIG. 12D is a perspective view of one of the guide tracks.

The guide tracks 42, 44 may be in any suitable shape, including the shape of a rod, as shown in FIG. 12D. The rods may be made of any suitable material including, for example, 0.375 inch 413 chromolly.

In one embodiment of the invention, each of the guide tracks 42, 44 has a first end 48 and a second end 50, with the first end 48 attached to the seat 14 proximal to the inertial locking reel 18 and the second end 50 attached to the seat 14 distal to the inertial locking reel 18. In another embodiment, as shown in FIGS. 11A and B, the at least one guide port 46 defines an opening 52 and the guide track 42 extends through the opening 52, as shown in FIGS. 4(A–C).

In an embodiment, as shown in FIGS. 1 and 10, the frame 12 is mounted to a first and second cross tube 54, 56 running through the upper and lower parts of the seat back 24, respectively. When in use, the passenger reaches back, grabs and pulls the second end 22 of the seat belt 20 which is extending from the extension member 16. By pulling on the second end 22 of the seat belt 20, the passenger causes the seat belt 20 to unwind from the inertial reel 18. This unwinding of the seat belt 20 causes the extension member 16 to slide up the frame 12 because, as shown in FIG. 8, as the seat belt 20 extends, it passes over two rollers 26, 30 which rotate due to friction between the belt 20 and the rollers 26, 30. The first roller 26 is attached to a portion of the extension member 16, thereby causing the extension member 16 to rise or slide up the frame 12, in unison with the seat belt 20.

Figure 9A:
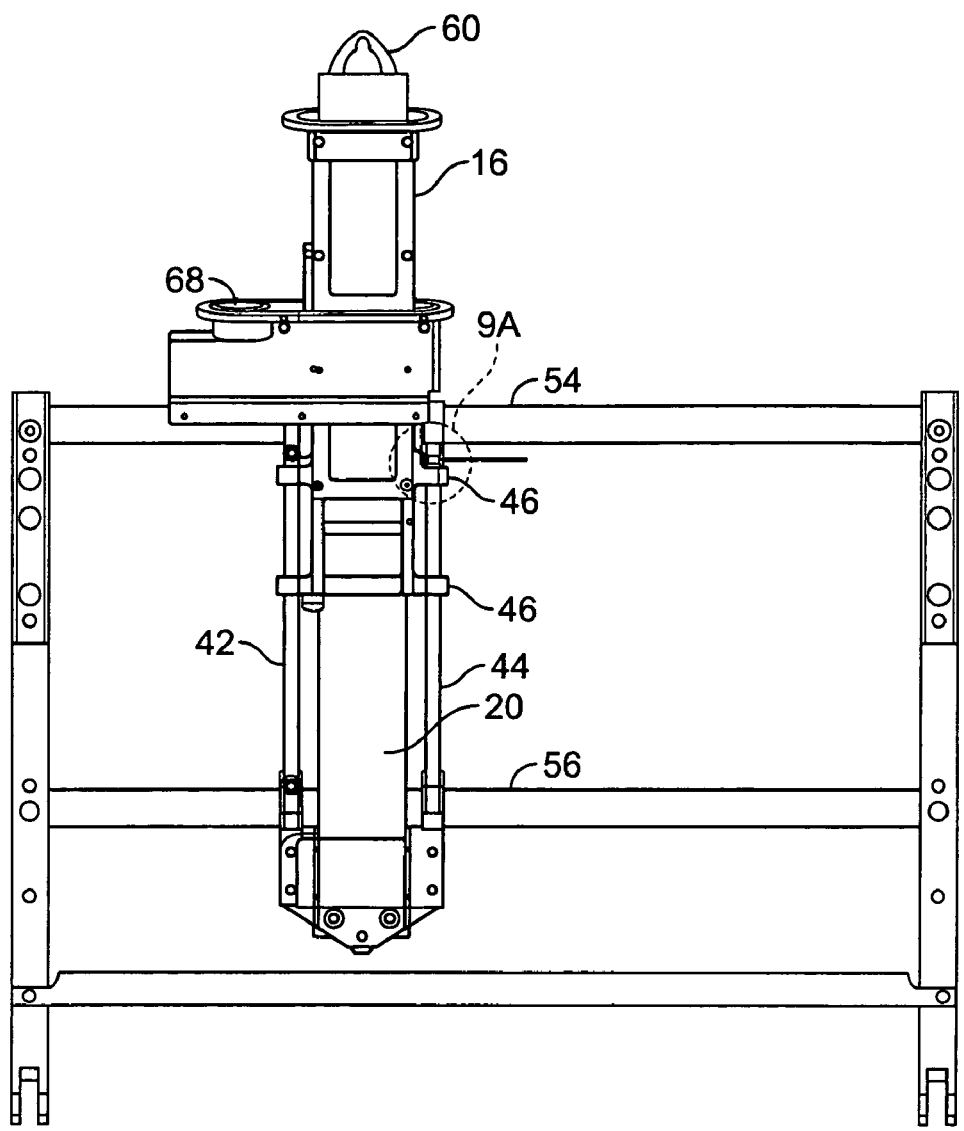
FIG. 9A is a front view of the seat belt guide assembly showing the assembly mounted on the back of a seat frame.
Figure 9B:
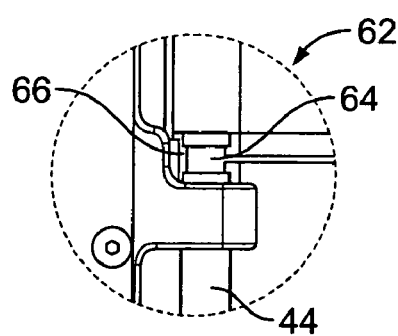
FIG. 9B is a close-up view of a locking mechanism used with the seat belt guide assembly.

In a specific version of the embodiment, as the extension member 16 reaches its full deployment, a positive lock 62 will engage and lock the extension member 16 in position, as shown in FIGS. 9(A–B). Once the passenger has extended the seat belt 20 the appropriate length, he secures the second end 22 of the belt 20 in a buckle mechanism 58 in the manner well known in the art. In order to facilitate the buckling of the seat belt 20 with the buckle mechanism 58, the second end 22 of the belt 20 may include a D-ring 60 or any other known attachment that is capable of interacting with the buckle mechanism 58.

Figure 13:
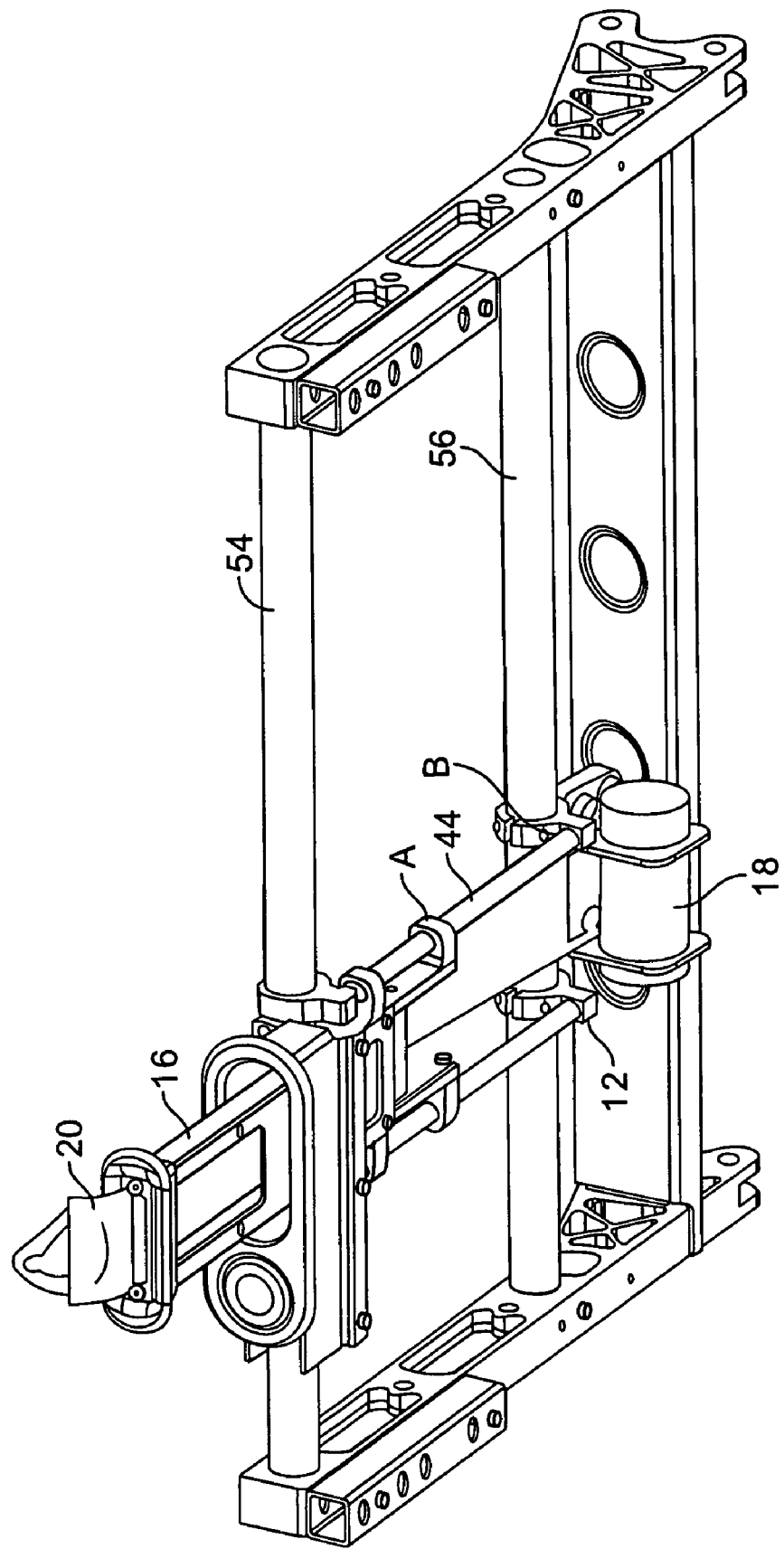
FIG. 13 is a perspective view of the seat belt guide assembly mounted in the back of a seat frame.

After the seat belt 20 is fastened to the buckle 58, the inertial locking reel 18 holds the belt 20 in place until the belt 20 is unfastened. When the seat belt 20 is unfastened, the seat belt 20 rewinds itself around the inertial reel 18. This causes the guide ports 46 of the extension member 16 to travel down the track 44 from point A to point B, as shown in FIG. 13. Once the belt 20 is retracted, the extension member 16 can be pushed back down into the frame 12. If a locking mechanism 62 was used to lock the extension member 16 in place, once the belt 20 is retraced, the passenger presses a disengagement button 64 to release the positive lock 62 holding the extension member 16 in place. The extension member 16 can then be pressed back down the frame 12 into the seat back 24.

The extension member 16 can be slidably mounted to the frame 12 in any number of known ways, including being placed in telescopic relation to the frame 12. Furthermore, as shown in FIGS. 4(A–C) and 7, the frame 12 has a first end 48 and a second end 50, and the inertial locking reel 18 may be located in proximity to the first end 48 of the frame 12.

If a lock 62 is used, the locking mechanism 62 can be any suitable lock 62 without departing from the scope and spirit of the invention. For example, as shown in FIGS. 9A and B, the locking mechanism 62, may include a groove 64 in one of the guide tracks 42, 44, a pin 66 capable of engaging the groove 64, and an activation button 68 capable of retracting the pin 66 from the groove 64.

In still another embodiment of the invention, as shown in FIGS. 4(A–C) and 7, the seat belt assembly 10 is comprised of a frame 12. This frame 12 is attached to a seat 14, as shown in FIGS. 1 and 10. The frame 12, as shown in FIGS. 4(A–C) and 7 has a first end 48 and a second end 50. An extension member 16 is slidably positioned within the frame 12 while an inertial locking reel 18 is located in proximity to the first end 48 of the frame 12. A seat belt 20 is positioned within the frame 12 in contact with the extension member 16. The seat belt 20 has a first end (not shown) engaged with the inertial locking reel 18 and a second end 22 extending from the second end 22 of the frame 12.

As described above, when in use, the passenger pulls on the second end 22 of the seat belt 20, thereby causing the extension member 16 to slide upward along the frame 12 as the belt 20 unwinds from the inertial locking reel 18. Once extended, the belt 20 is attached to a buckle mechanism 58 in a manner known in the art.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A seat belt assembly comprised of:
a frame attached to a seat;
an extension member connected to the frame;
an inertial locking reel; and
a seat belt positioned within the frame in contact with the extension member, the seat belt having a first end engaged with the inertial locking reel and a second end extending from the extension member;
wherein a first roller is attached to the extension member;
a second roller is attached to the frame; and
the seat belt engages both the first and second roller.

2. The seat belt assembly of claim 1, wherein the extension member is capable of sliding with respect to the frame.

3. The seat belt assembly of claim 1, wherein the extension member is in a telescopic relation with the frame.

4. The seat belt assembly of claim 1, wherein the seat belt passes over both the first and the second roller.

5. The seat belt assembly of claim 1, wherein
the frame has a first end and a second end; and
the inertial locking reel is located in proximity to the first end of the frame.

6. A seat belt assembly comprised of:
a frame attached to a seat;
an extension member connected to the frame, the extension member having a first edge extending between a first end and a second end, a second edge separated from and substantially parallel to the first edge, and a backing plate extending between the first edge and the second edge;
an inertial locking reel; and
a seat belt positioned within the frame in contact with the extension member, the seat belt having a first end engaged with the inertial locking reel and a second end extending from the extension member;
wherein the frame includes a first and second guide track substantially parallel to each other and adjacent to the first and second edge, respectively, of the extension member;
a portion of each edge defines at least one guide port; and
the first and second guide track extend through the at least one guide port in the first and second edge, respectively.

7. The seat belt assembly of claim 6, wherein each of the guide tracks are in the shape of a rod.

8. The seat belt assembly of claim 6, wherein:
the at least one guide port defines an opening; and
the guide track extends through the opening.

9. The seat belt assembly of claim 6, wherein:
the first and second guide tracks each have a first end and a second end;
the first end of each of the guide tracks is attached to the seat proximal to the inertial locking reel; and
the second end of each of the guide tracks is attached to the seat distal to the inertial locking reel.

10. The seat belt assembly of claim 6, wherein the extension member is capable of sliding with respect to the frame.

11. The seat belt assembly of claim 6, wherein the extension member is in a telescopic relation with the frame.

12. The seat belt assembly of claim 6, wherein
the frame has a first end and a second end; and
the inertial locking reel is located in proximity to the first end of the frame.

13. A seat belt assembly comprised of:
a frame attached to a seat, the frame including a first and second guide track substantially parallel to each other;
an extension member connected to the frame;
an inertial locking reel;
a seat belt positioned within the frame in contact with the extension member, the seat belt having a first end engaged with the inertial locking reel and a second end extending from the extension member; and
a locking mechanism attached to the extension member, wherein the locking mechanism includes a groove in one of the guide tracks, a pin capable of engaging the groove, and an activation button capable of retracting the pin from the groove.

14. The seat belt assembly of claim 13, wherein:
the first and second guide tracks extend along first and second edges of the frame;
a portion of each first and second edge defines at least one guide port; and
the first and second guide tracks extend through the at least one guide port in the first and second edges, respectively.

15. The seat belt assembly of claim 14, wherein each of the guide tracks are in the shape of a rod.

16. The seat belt assembly of claim 14, wherein:
the at least one guide port defines an opening; and
the guide track extends through the opening.

17. The seat belt assembly of claim 13, wherein the extension member is capable of sliding with respect to the frame.

18. The seat belt assembly of claim 13, wherein the extension member is in a telescopic relation with the frame.

19. The seat belt assembly of claim 13, wherein
the frame has a first end and a second end; and
the inertial locking reel is located in proximity to the first end of the frame.

20. A seat belt assembly comprised of:
a frame coupled with a seat back;
a passive extension member coupled with the frame, the passive extension member being movable between a first position within the seat back, and a second position substantially elevated above a top surface of the seat back;
an inertial locking reel connected to the frame; and
a seat belt positioned within the frame in contact with the passive extension member, the seat belt having a first end engaged with the inertial locking reel and a second end extending from the extension member;
wherein the passive extension member moves from the first position to the second position according to movement of the second end of the seat belt away from the inertial locking reel.

21. The seat belt assembly of claim 20, wherein the passive extension member is capable of sliding with respect to the frame.

22. The seat belt assembly of claim 20, wherein the passive extension member is in a telescopic relation with the frame.

* * * * *